June 23, 1925.  
B. H. BLOOD  
TAPER GAUGE  
Filed March 29, 1922

1,543,244

INVENTOR  
B. H. Blood  
BY  
Joseph K. Schofield  
ATTORNEY

Patented June 23, 1925.

1,543,244

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

TAPER GAUGE.

Application filed March 29, 1922. Serial No. 547,829.

*To all whom it may concern:*

Be it known that I, BRYANT H. BLOOD, a citizen of the United States, residing at Hartford, in the county of Hartford and State of Connecticut, have invented certain new and useful Improvements in Taper Gauges, of which the following is a specification.

This invention relates to a gauge and particularly to a gauge adapted to determine the correctness of the taper of conical surfaces. In particular the invention is adapted for measuring the accuracy of Briggs standard pipe threads commonly used for pipes and pipe fittings.

An object of the invention is to provide a gauge which may be readily used in connection with the manufacture and inspection of threaded tapered articles to determine the accuracy of their tapered surfaces. Further objects of the invention are to provide a gauge which indicates, within narrow limits, imperfections and inaccuracies in the taper on threaded articles and which may be used either for externally threaded articles or articles threaded on their inside conical surfaces. The invention is also adapted for determining the accuracy of conical surfaces either internal or external having plain surfaces.

One feature which enables me to accomplish the above objects is that the gauge comprises two separate members, each member provided with a narrow portion adapted to contact with the conical surface to be measured and being either plain or threaded depending upon the character of the work being gauged. Indicia is provided on each part so that the relative positions of the two gauge members when in operative or gauging positions may be determined quickly and readily.

With these and other objects in view, my invention consists in the features of construction and operation set forth in the following specification and illustrated in the accompanying drawing.

In the accompanying drawing annexed hereto and forming a part of this specification, I have shown my invention embodied respectively in taper thread gauges for internal and external threads but it will be understood that the invention can be otherwise embodied and that the drawing is not to be construed as defining or limiting the scope of the invention, the claims appended to this specification being relied upon for that purpose.

In the above mentioned drawing, I have shown but two modifications of the invention which are now deemed preferable, and it is to be understood that changes and modifications may be made within the scope of the appended claims without departing from the spirit of the invention.

Briefly, my invention in its broadest aspect comprises the following principal parts; first, a gauging member having one of its surfaces so formed that it is adapted to engage a narrow portion of the surface to be gauged; second, another gauging member adapted to contact with an adjacent narrow portion of the surface to be gauged; third, co-operating indicia on the two gauging members whereby the relative positions or the distance apart of the two members may be determined when in gauging or operative positions.

Figure 1:
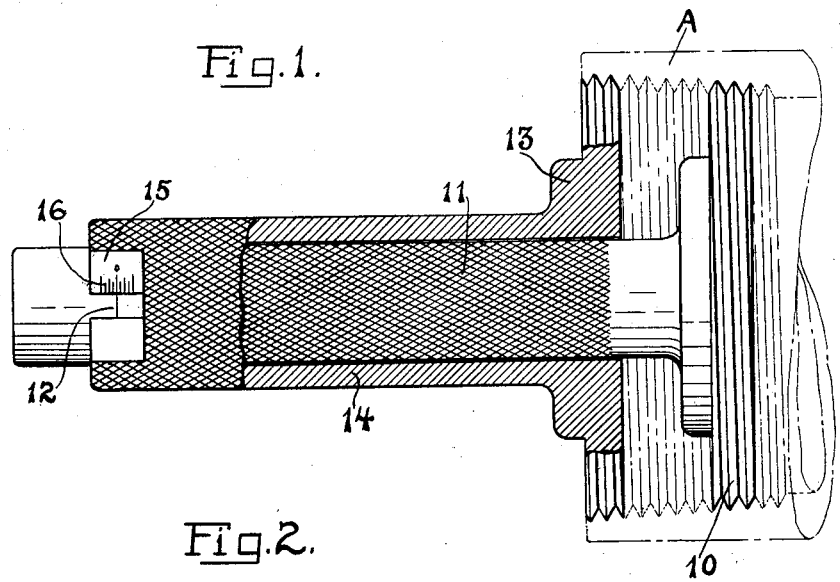
Figure 1 shows one modification of the invention the two members of which are in operative or gauging positions relative to tapered, internally threaded articles.

Referring more in detail to the figures of the drawing, I have shown in dotted outline in Fig. 1, a pipe fitting or coupling A taper threaded on its internal surface. This form of taper thread, as shown, is that usually employed in couplings or other pipe fittings and is usually of the well known Briggs standard pipe thread form. Adapted to contact with portions of this threaded surface near its inner end is a gauge member 10 having two or three convolutions of accurately formed screw threads corresponding exactly to the standard threads for the coupling or other article to be tested. This gauging member is of generally disk form and is fastened to a shank or handle extension 11 preferably knurled as shown having a circumferential line 12 near its free end, this line forming one part of the indicia to be presently described. Fitting over the shank 11 of this first gauging member 10 is a second member 13, the outer periphery of which is of disk form and threaded to conform to an adjacent portion of standard accurately formed threads for the article to be gauged. This member 13 has a sleeve-like projection 14 through which the shank 11 of the first gauging member 10 may freely slide. The sleeve portion 14 of this second gauging member 13 also may be suitably knurled for convenience in handling and at its outer end is provided with a flattened surface 15 on which graduations 16 may be stamped. These graduations 16, when the gauging member 10 and 13 are in cooperative gauging relation, are directly opposite the indicia line 12 on the shank 11 of the first gauging member 10 as indicated in Fig. 1.

It will be obvious that in making the work contacting surfaces of the gauge members 10 and 13, they must be accurately made to conform not only to a particular taper of standard screw threads corresponding to the particular article to be gauged, but also must correspond to the particular form and lead of the screw threads. This may conveniently be done by securing the two gauge members 10 and 13 rigidly together in proper relative position and finishing the screw threads to a master gauge as if the gauge members 10 and 13 were one solid member.

It is obvious that with the threaded portions of the two gauging members 10 and 13 formed in precise accordance with Briggs, or other standard tapered threads, then when they are in contact with an article A to be tested, the zero of the graduation lines 16 will be in alignment with the indicia line 12 of the shank 11 if the article being gauged is of correct taper and of correct threaded form. If, however, the taper of the article A is not correct, the second gauge member 13 will be in contact with the threaded portion of the article A being gauged at a point slightly closer to or further from the first gauging member 10. The relative position of each may be readily observed by the indicia 12 and 16 above described.

Figure 2:
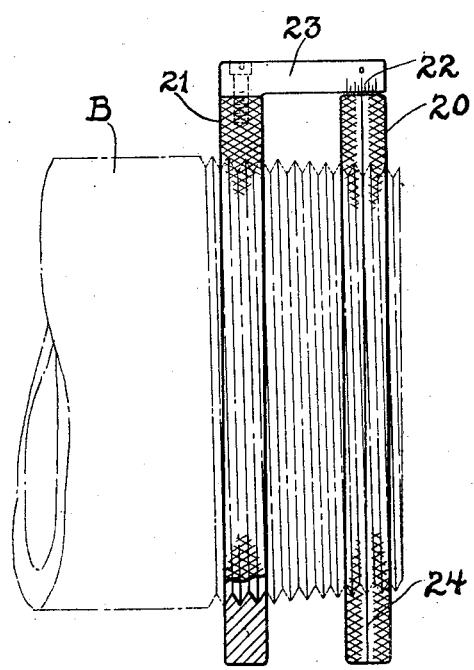
Fig. 2 shows another modification of the invention adapted for gauging tapered, externally threaded articles.

In Fig. 2 I have shown a modified form of the invention adapted to be applied to the gauging of external tapered threads such as are commonly used on the ends of pipes or other bodies such as B. This comprises two ring-like gauge members 20 and 21, the internal surfaces of which are threaded in conformity with adjacent portions of standard tapered threads in common use and are adapted to be placed in threaded engagement with different parts of the threaded article A to be gauged. The relative position of the gauges 20 and 21 and their distance apart when in gauging or operative position is indicated by the graduations 22 on an overhanging arm 23 outstanding from gauge member 21 and extending over the gauging member 20. A circumferential line 24 on the first gauge member 20 may be cut therein to provide a zero line for the graduations 22 on the second member 21.

The invention is primarily adapted to determine the correctness of the taper of screw threaded articles. Errors of this nature are evidenced by the distance of the zero line on one gauge member from the zero graduation on the other gauge member. Errors in diameter of the article being gauged are indicated by the distance the gauge members may be threaded on or into the threaded articles. Any error in diameters does not affect the readings of the graduations indicating errors in the taper of the threads.

What I claim is:

1. A gauge for bodies having conical surfaces comprising in combination, a gauge member adapted to contact with a portion of the conical surface being gauged, a second gauge member adapted to contact with another portion of said surface axially spaced from said member, said members being relatively rotatable while in operative positions, and means to indicate the relative positions of said gauge members when in gauging positions.

2. A gauge for bodies having conical surfaces comprising in combination, a gauge member adapted to contact with a portion of the conical surface being gauged, a second gauge member adapted to contact with another portion of said surface, said members being relatively rotatable while in operative positions, the axes of said gauging members being in alignment, and means to indicate the relative positions of said gauge members when in gauging positions.

3. A gauge for bodies having conical surfaces comprising in combination, a gauge member adapted to contact with a narrow portion of the conical surface being gauged, a second gauge member adapted to contact with another narrow portion of said surface axially spaced from the portion engaged by said first member, said members being relatively rotatable while in operative positions, and means to indicate the relative positions of said gauge members when in gauging positions.

4. A gauge for bodies having conical surfaces comprising in combination, a gauge member adapted to contact with a portion of the conical surface being gauged, a second gauge member adapted to contact with another portion of said surface, said members being relatively rotatable while in operative position, and means to indicate the distance apart of said gauge member axially of said body when in gauging positions.

5. A gauge for bodies having conical surfaces comprising in combination, a gauge member adapted to contact with a narrow portion of the conical surface being gauged, a second gauge member adapted to contact with another narrow portion of said surface, said gauge members being in axial alignment and relatively rotatable while in operative positions, and means to indicate the distance apart of said gauge members when in gauging positions.

6. A gauge for bodies having threaded conical surfaces comprising in combination, a gauge member having a threaded portion adapted to contact with a part of the threaded conical surface to be gauged, a second gauge member having a threaded portion adapted to contact with another part of the surface to be gauged, said members being relatively rotatable while in operative positions, and means to indicate the relative positions of said gauge members when in gauging positions.

7. A gauge for bodies having threaded conical surfaces comprising in combination, a gauge member having a narrow threaded portion adapted to contact with a part of the threaded conical surface to be gauged, a second gauge member having a narrow threaded portion adapted to contact with another part of the surface to be gauged, said members being relatively rotatable while in operative positions, and means to indicate the relative positions of said gauge members when in gauging positions.

8. A gauge for bodies having threaded conical surfaces comprising in combination, a gauge member having a threaded portion adapted to contact with a part of the threaded conical surface to be gauged, a second gauge member having a threaded portion adapted to contact with another part of the surface to be gauged, the axes of said gauging members being in alignment, said members being relatively rotatable while in operative positions, and means to indicate the relative positions of said gauge members when in gauging position.

9. A gauge for bodies having threaded conical surfaces comprising in combination, a gauge member having a threaded portion adapted to contact with a part of the threaded conical surface to be gauged, a second gauge member having a threaded portion adapted to contact with another part of the surface to be gauged, said members being relatively rotatable while in operative positions, and means to indicate the distance apart of said gauge members when in gauging position.

10. A gauge for bodies having threaded conical surfaces comprising in combination, a gauge member having a threaded portion adapted to contact with a part of the threaded conical surface to be gauged and having a shank extending axially therefrom, a second gauge member having a threaded portion adapted to contact with another part of the surface to be gauged, said second gauge member having a sleeve extending axially therefrom, said members being relatively rotatable while in operative positions, and means on said shank and sleeve to indicate the relative positions of said gauge members when in said gauging positions.

In testimony whereof, I hereto affix my signature.

BRYANT H. BLOOD.